(12) United States Patent
Fattal et al.

(10) Patent No.: US 11,448,896 B2
(45) Date of Patent: Sep. 20, 2022

(54) MULTILAYER MULTIVIEW DISPLAY AND METHOD

(71) Applicant: LEIA INC., Menlo Park, CA (US)

(72) Inventors: David A. Fattal, Mountain View, CA (US); Xuejian Li, Menlo Park, CA (US); Francesco Aieta, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 50 days.

(21) Appl. No.: 16/588,747

(22) Filed: Sep. 30, 2019

(65) Prior Publication Data

US 2020/0033619 A1 Jan. 30, 2020

Related U.S. Application Data

(63) Continuation of application No. PCT/US2017/053823, filed on Sep. 27, 2017.
(Continued)

(51) Int. Cl.
*G02B 30/56* (2020.01)
*F21V 8/00* (2006.01)
*G02B 27/42* (2006.01)

(52) U.S. Cl.
CPC ............ *G02B 30/56* (2020.01); *G02B 6/004* (2013.01); *G02B 6/0065* (2013.01);
(Continued)

(58) Field of Classification Search
CPC ...... G02B 30/56; G02B 6/004; G02B 6/0065; G02B 6/0068; G02B 6/0075; G02B 27/42
See application file for complete search history.

(56) References Cited

U.S. PATENT DOCUMENTS 6,580,529 B1 6/2003 Amitai et al.
9,128,226 B2 9/2015 Fattal et al.
(Continued)

FOREIGN PATENT DOCUMENTS

CN 106443867 A 2/2017
JP S62-203122 A 9/1987
(Continued)

OTHER PUBLICATIONS

International Search Report and Written Opinion (ISRWO) by International Searching Authority (ISA) Korean Intellectual Property Office (KIPO), dated Jan. 5, 2018 (15 pages) for counterpart parent PCT Application No. PCT/US2017/053823.
(Continued)

*Primary Examiner* — Mohammed S Rahaman
(74) *Attorney, Agent, or Firm* — J. Michael Johnson

(57) ABSTRACT

A multilayer static multiview display and method of multilayer multiview display operation provide a plurality of multiview images using diffractive scattering of light from guided light beams having different radial directions. The static multiview display includes a first multiview display layer configured to emit directional light beams representing a first multiview image by diffractive scattering light from a radial pattern of guided light beams within the first multiview display layer. The static multiview display further includes a second multiview display layer configured to emit directional light beams representing a second static multiview image by diffractive scattering light from a radial pattern of guided light beams within the second multiview display layer. The provided plurality of multiview images may include a composite color multiview image, a static multiview image, or an animated or quasi-static multiview image.

24 Claims, 8 Drawing Sheets

Related U.S. Application Data

(60) Provisional application No. 62/481,628, filed on Apr. 4, 2017.

(52) U.S. Cl.
CPC ......... *G02B 6/0068* (2013.01); *G02B 6/0075* (2013.01); *G02B 27/42* (2013.01)

(56) References Cited

U.S. PATENT DOCUMENTS

| | | | |
|---|---|---|---|
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,802,443 B2 | 10/2020 | Fattal | |
| 2005/0041174 A1 | 2/2005 | Numata et al. | |
| 2005/0140832 A1 | 6/2005 | Goldman et al. | |
| 2006/0191177 A1* | 8/2006 | Engel | G09F 9/35 40/453 |
| 2007/0129864 A1 | 6/2007 | Tanaka et al. | |
| 2007/0298533 A1 | 12/2007 | Yang et al. | |
| 2008/0204663 A1 | 8/2008 | Balogh | |
| 2008/0225393 A1 | 9/2008 | Rinko | |
| 2009/0244706 A1 | 10/2009 | Levola et al. | |
| 2010/0039832 A1 | 2/2010 | Ahlgren et al. | |
| 2010/0302803 A1 | 12/2010 | Bita et al. | |
| 2011/0002143 A1 | 1/2011 | Saarikko et al. | |
| 2011/0141395 A1 | 6/2011 | Kashira | |
| 2012/0113678 A1 | 5/2012 | Cornelissen et al. | |
| 2013/0057159 A1 | 3/2013 | Pijlman et al. | |
| 2013/0265802 A1 | 10/2013 | Kamikatano et al. | |
| 2015/0036068 A1* | 2/2015 | Fattal | G02F 1/133615 349/15 |
| 2015/0205034 A1 | 7/2015 | Faecke et al. | |
| 2016/0033784 A1 | 2/2016 | Levola et al. | |
| 2017/0010466 A1* | 1/2017 | Klug | G02B 27/4272 |
| 2017/0085867 A1 | 3/2017 | Baran et al. | |
| 2017/0090096 A1 | 3/2017 | Fattal | |
| 2017/0192244 A1* | 7/2017 | Shinohara | G02B 6/003 |
| 2017/0299793 A1 | 10/2017 | Fattal | |
| 2017/0299794 A1 | 10/2017 | Fattal | |
| 2017/0363794 A1* | 12/2017 | Wan | G02B 6/0025 |
| 2018/0004156 A1* | 1/2018 | Schilling | G02B 5/1861 |
| 2018/0024289 A1 | 1/2018 | Fattal | |

FOREIGN PATENT DOCUMENTS

| | | |
|---|---|---|
| JP | H05-232519 A | 9/1993 |
| JP | H06-082612 A | 3/1994 |
| JP | H06-332354 A | 12/1994 |
| JP | H07-162026 A | 6/1995 |
| JP | H11-133255 A | 5/1999 |
| JP | 2000267041 A | 9/2000 |
| JP | 2001175197 A | 6/2001 |
| JP | 2004302186 A | 10/2004 |
| JP | 2002031788 A | 2/2012 |
| JP | 2012022085 A | 2/2012 |
| JP | 2016180776 A | 10/2016 |
| KR | 20130017886 A | 2/2013 |
| WO | 2014051623 A1 | 4/2014 |
| WO | 2016111707 A | 7/2016 |
| WO | 2016171705 A | 10/2016 |
| WO | 2018128657 A1 | 7/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed), (2010), pp. 683-711, ISBN: 978-953-307-088-9, InTech, Available from: http://www.intechopen.com/books/advances-in-lasers-and-electro-optics/iolographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Chun-Wei Liu, et al., Sub-wavelength gratings fabricated on a light bar by roll-to-roll UV embossing process, Optics Express, Jun. 6, 2011, pp. 11299-11311, vol. 19, No. 12.

\* cited by examiner

MULTILAYER MULTIVIEW DISPLAY AND METHOD

CROSS-REFERENCE TO RELATED APPLICATIONS

This application is a continuation patent application of and claims the benefit of priority to International Application No. PCT/US2017/053823, filed Sep. 27, 2017, which claims priority to U.S. Provisional Patent Application Ser. No. 62/481,628, filed Apr. 4, 2017, the entirety of each of which is incorporated by reference herein.

STATEMENT REGARDING FEDERALLY SPONSORED RESEARCH OR DEVELOPMENT

N/A

BACKGROUND

Displays and more particularly 'electronic' displays are a nearly ubiquitous medium for communicating information to users of a wide variety of devices and products. For example, electronic displays may be found in various devices and applications including, but not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices. Electronic displays generally employ a differential pattern of pixel intensity to represent or display an image or similar information that is being communicated. The differential pixel intensity pattern may be provided by reflecting light incident on the display as in the case of passive electronic displays. Alternatively, the electronic display may provide or emit light to provide the differential pixel intensity pattern. Electronic displays that emit light are often referred to as active displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
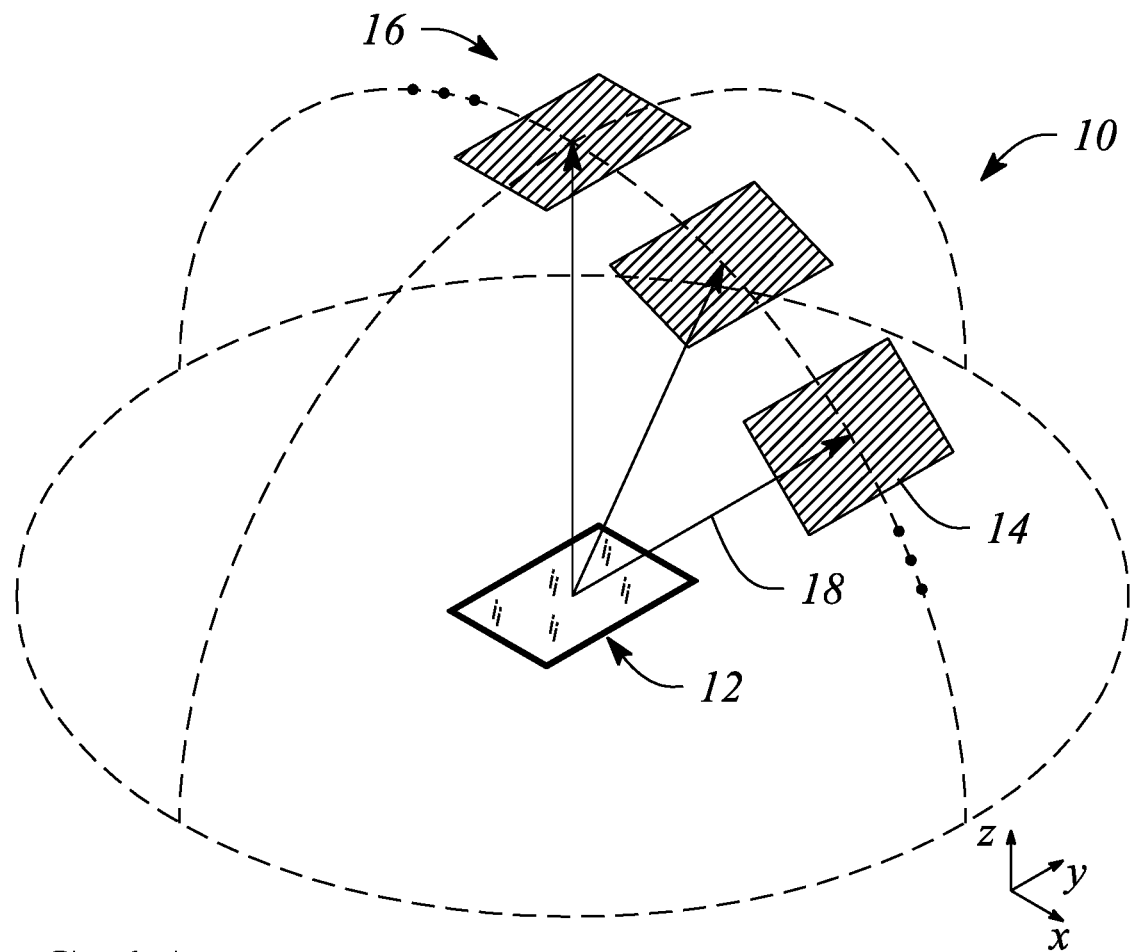
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide display of a plurality of three-dimensional (3D) or multiview images using a multilayer multiview display. In particular, embodiments consistent with the principles described display the multiview images using a plurality of multiview display layers configured to provide directional light beams. Individual intensities and directions of directional light beams of the directional light beam plurality, in turn, correspond to various view pixels in views of the multiview images being displayed. According to various embodiments, the individual intensities and, in some embodiments, the individual directions of the directional light beams may be substantially predetermined or 'fixed.' As such, the displayed multiview images may be static or quasi-static multiview images, in some embodiments.

According to various embodiments, a multiview display layer of a multilayer static multiview display comprise diffraction gratings optically connected to a light guide to provide the directional light beams having the individual directional light beam intensities and directions. The diffraction gratings are configured to emit or provide the directional light beams by or according to diffractive coupling or scattering out of light guided from within the light guide, the light being guided as a plurality of guided light beams. Further, guided light beams of the guided light beam plurality are guided within the light guide at different radial directions from one another. As such, a diffraction grating of the diffraction grating plurality comprises a grating characteristic that accounts for or that is a function of a particular radial direction of a guided light beam incident on the diffraction grating. In particular, the grating characteristic may be a function of a relative location of the diffraction grating and a light source configured to provide the guided light beam. According to various embodiments, the grating characteristic is configured to account for the radial direction of the guided light beam to insure a correspondence between the emitted directional light beams provide by the diffraction gratings and associated view pixels in various views of the multiview images being displayed.

Herein, a 'multiview display' is defined as an electronic display or display system configured to provide different views of a multiview image in different view directions. A 'static multiview display' is a defined as a multiview display configured to display a predetermined or fixed (i.e., static) multiview image, albeit as a plurality of different views. A 'quasi-static multiview display' is defined herein as a static multiview display that may be switched between different fixed multiview images, typically as a function of time. Switching between the different fixed multiview images may provide a rudimentary form of animation, for example. Further as defined herein, a quasi-static multiview display is a type of static multiview display. As such, no distinction is made between a purely static multiview display or image and a quasi-static multiview display or image, unless such distinction is necessary for proper understanding.

FIG. 1A illustrates a perspective view of a multiview display 10 in an example, according to an embodiment consistent with the principles described herein. As illustrated in FIG. 1A, the multiview display 10 comprises a diffraction grating on a screen 12 configured to display a view pixel in a view 14 within or of a multiview image 16 (or equivalently a view 14 of the multiview display 10). The screen 12 may be a display screen of an automobile, a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image 16 in different view directions 18 (i.e., in different principal angular directions) relative to the screen 12. The view directions 18 are illustrated as arrows extending from the screen 12 in various different principal angular directions. The different views 14 are illustrated as shaded polygonal boxes at the termination of the arrows (i.e., depicting the view directions 18). Thus, when the multiview display 10 (e.g., as illustrated in FIG. 1A) is rotated about the y-axis, a viewer sees different views 14. On the other hand (as illustrated) when the multiview display 10 in FIG. 1A is rotated about the x-axis the viewed image is unchanged until no light reaches the viewer's eyes (as illustrated).

Note that, while the different views 14 are illustrated as being above the screen 12, the views 14 actually appear on or in a vicinity of the screen 12 when the multiview image 16 is displayed on the multiview display 10 and viewed by the viewer. Depicting the views 14 of the multiview image 16 above the screen 12 as in FIG. 1A is done only for simplicity of illustration and is meant to represent viewing the multiview display 10 from a respective one of the view directions 18 corresponding to a particular view 14. Further, in FIG. 1A only three views 14 and three view directions 18 are illustrated, all by way of example and not limitation.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
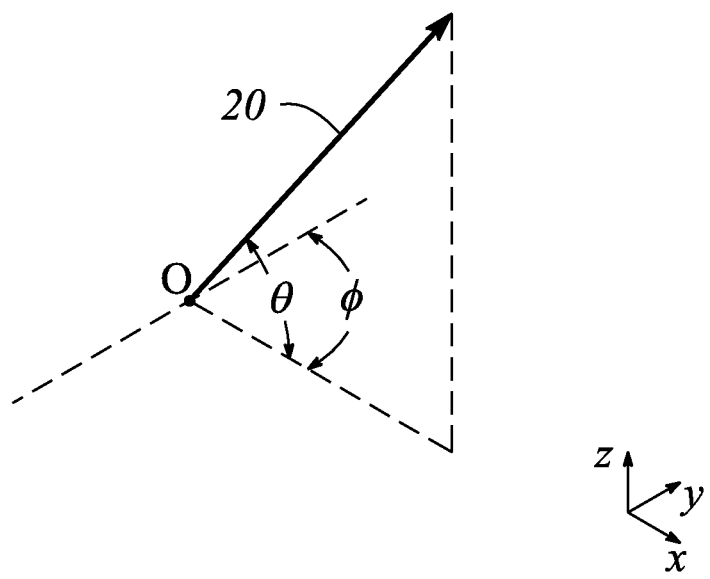
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 18 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

In the multiview display, a 'multiview pixel' is defined herein as a set or plurality of view pixels representing pixels in each of a similar plurality of different views of a multiview display. Equivalently, a multiview pixel may have an individual view pixel corresponding to or representing a pixel in each of the different views of the multiview image to be displayed by the multiview display. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on.

In some embodiments, a number of view pixels in a multiview pixel may be equal to a number of views of the multiview display. For example, the multiview pixel may provide eight (8) view pixels associated with a multiview display having 8 different views. Alternatively, the multiview pixel may provide sixty-four (64) view pixels associated with a multiview display having 64 different views. In another example, the multiview display may provide an eight by four array of views (i.e., thirty-two views) and the multiview pixel may include thirty-two (32) view pixels (i.e., one for each view). Further, according to some embodiments, a number of multiview pixels of the multiview display may be substantially equal to a number of pixels that make up a selected view of the multiview display.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may comprise a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. According to various embodiments and examples, the diffraction grating may be a sub-wavelength grating having a grating spacing or distance between adjacent diffractive features that is less than about a wavelength of light that is to be diffracted by the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure comprising diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

As described further below, a diffraction grating herein may have a grating characteristic, including one or more of a feature spacing or pitch, an orientation and a size (such as a width or length of the diffraction grating). Further, the grating characteristic may selected or chosen to be a function of the angle of incidence of light beams on the diffraction grating, a distance of the diffraction grating from a light source or both. In particular, the grating characteristic of a diffraction grating may chosen to depend on a relative location of the light source and a location of the diffraction grating, according to some embodiments. By appropriately varying the grating characteristic of the diffraction grating, both an intensity and a principal angular direction of a light beam diffracted (e.g., diffractively coupled-out of a light guide) by the diffraction grating (i.e., a 'directional light beam') corresponds to an intensity and a view direction of a view pixel of the multiview image.

According to various examples described herein, a diffraction grating (e.g., a diffraction grating of a multiview pixel, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}(n \sin \theta_i - m\lambda/d) \qquad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
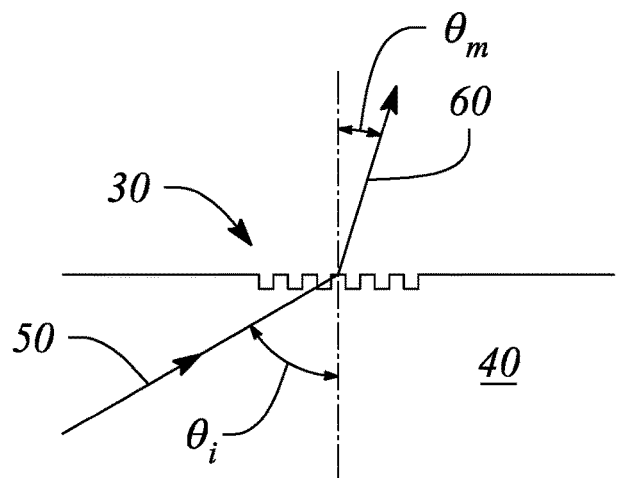
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam (or a collection of light beams) 50 incident on the diffraction grating 30 at an incident angle $\theta_i$. The light beam 50 is a guided light beam within the light guide 40. Also illustrated in FIG. 2 is a coupled-out light beam (or a collection of light beams) 60 diffractively produced and coupled-out by the diffraction grating 30 as a result of diffraction of the incident light beam 20. The coupled-out light beam 60 has a diffraction angle $\theta_m$ (or 'principal angular direction' herein) as given by equation (1). The coupled-out light beam 60 may correspond to a diffraction order 'm' of the diffraction grating 30, for example.

According to various embodiments, the principal angular direction of the various light beams is determined by the grating characteristic including, but not limited to, one or more of a size (e.g., a length, a width, an area, etc.) of the diffraction grating, an orientation, and a feature spacing. Further, a light beam produced by the diffraction grating has a principal angular direction given by angular components $\{\theta, \phi\}$, by definition herein, and as described above with respect to FIG. 1B.

Herein, a 'collimated light' or 'collimated light beam' is generally defined as a beam of light in which rays of the light beam are substantially parallel to one another within the light beam (e.g., the guided light beam in the light guide). Further, rays of light that diverge or are scattered from the collimated light beam are not considered to be part of the collimated light beam, by definition herein. Moreover, herein a 'collimator' is defined as substantially any optical device or apparatus that is configured to collimate light.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a diffraction grating' means one or more diffraction gratings and as such, 'the diffraction grating' means 'the diffraction grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
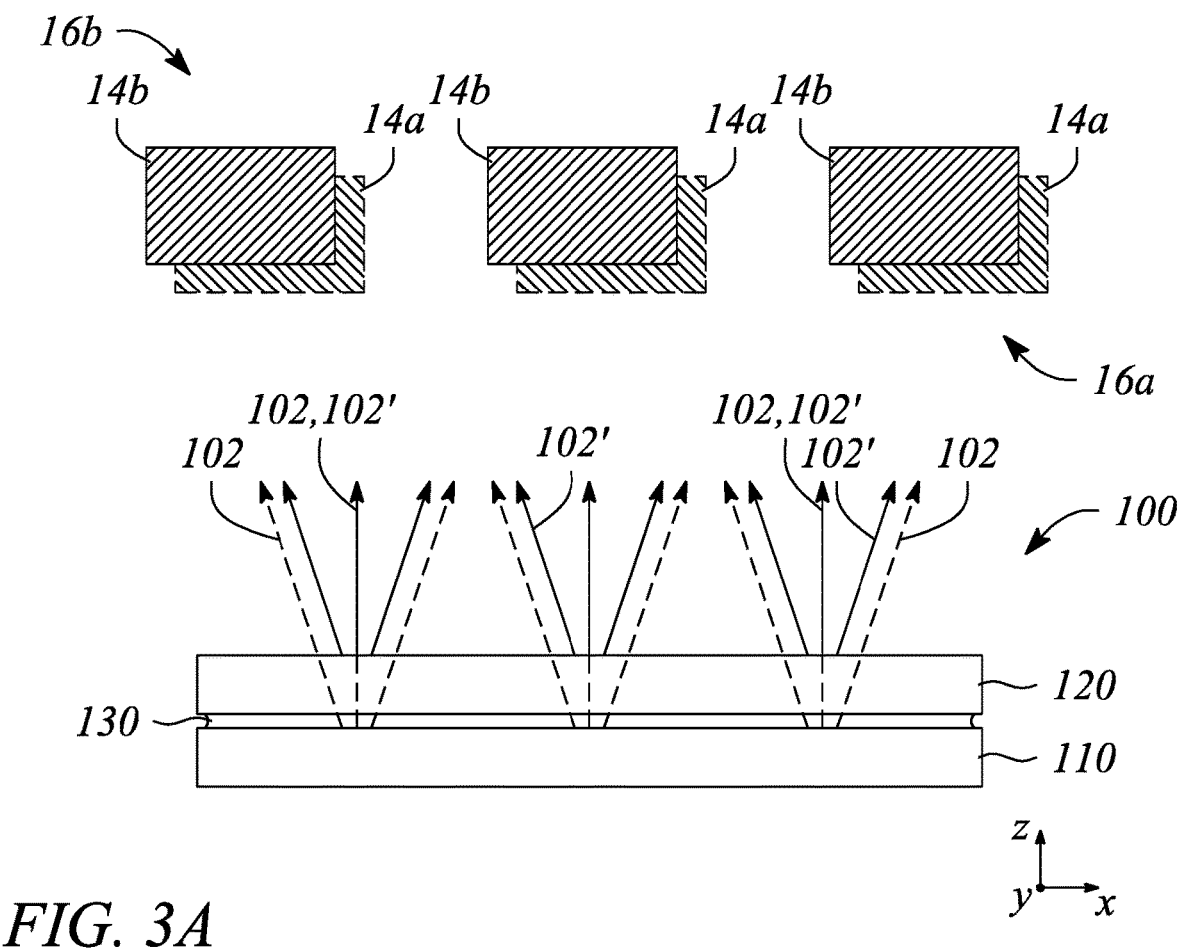
FIG. 3A illustrates a cross-sectional view of a multilayer static multiview display in an example, according to an embodiment consistent with the principles described herein.
Figure 3B:
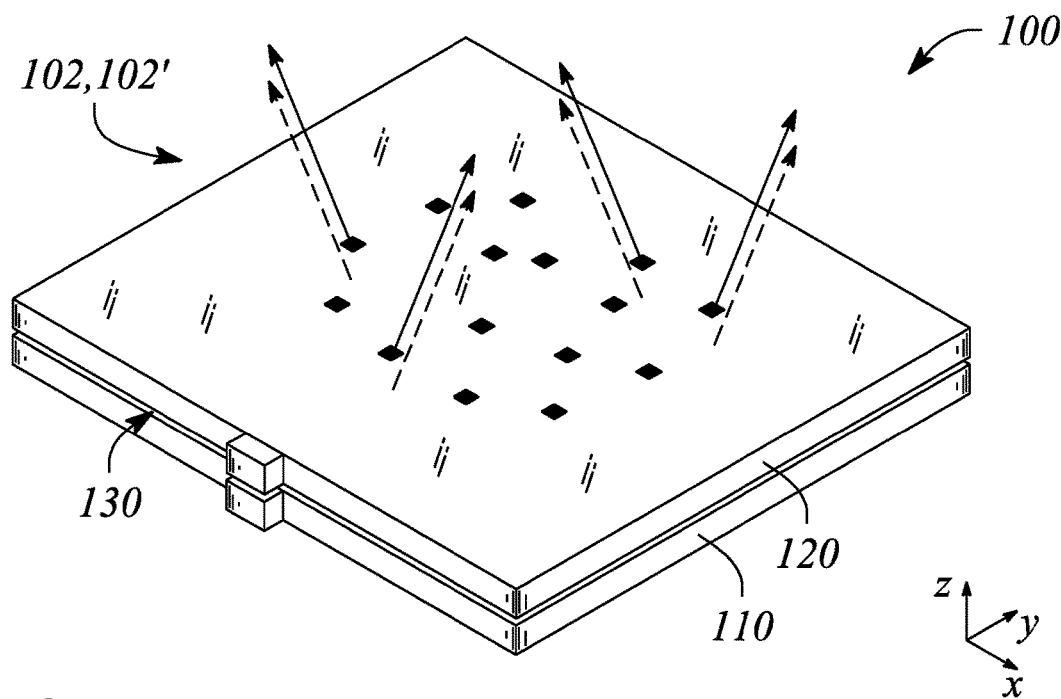
FIG. 3B illustrates a perspective view of a multilayer static multiview display in an example, according to an embodiment consistent with the principles described herein.

According to some embodiments of the principles described herein, a multilayer multiview display configured to provide multiview images and more particularly static multiview images (i.e., as a multilayer static multiview display) is provided. FIG. 3A illustrates a cross-sectional view of a multilayer static multiview display 100 in an example, according to an embodiment consistent with the principles described herein. FIG. 3B illustrates a perspective view of a multilayer static multiview display 100 in an example, according to an embodiment consistent with the principles described herein. According to some embodiments, the illustrated multilayer static multiview display 100 is configured to provide purely a static multiview image, while in others the multilayer static multiview display 100 may be configured to provide a plurality of multiview images (e.g., in a time sequence) and thus functions as (or is) a quasi-static multiview display. For example, the multilayer static multiview display 100 may be switchable between different fixed multiview images or equivalently between a plurality of multiview image states, as described below. Further, according to some embodiments, the multilayer static multiview display 100 may be configured to display a color static or quasi-static multiview image.

As illustrated, the multilayer static multiview display 100 comprises a first multiview display layer 110. The first multiview display layer 110 is configured to emit directional light beams 102 representing a first multiview image. According to various embodiments, the directional light beams 102 are emitted by diffractive scattering a radial pattern of guided light beams within the first multiview display layer 110. In particular, the directional light beams 102 may be emitted in a plurality of different directions (i.e., different view directions) representing different views of the first multiview image.

The multilayer static multiview display 100 further comprises a second multiview display layer 120. The second multiview display layer 120 is configured to emit directional light beams 102' representing a second multiview image. According to various embodiments, the directional light beams 102' are emitted by diffractive scattering from a radial pattern of guided light beams within the second multiview display layer 120. As illustrated, the second multiview display layer 120 is adjacent to an emission surface of the first multiview display layer 110.

Further, the second multiview display layer 120 is configured to be transparent to the first multiview image, according to various embodiments. For example, the second multiview display layer 120 may be transparent or at least substantially transparent to the directional light beams 102 emitted by the first multiview display layer 110. As such, the directional light beams 102 may pass or be transmitted through the second multiview display layer 120 to facilitate viewing of the second multiview image.

In FIG. 3A, different views 14a of a first multiview image 16a provided by or display using the directional light beams 102 from the first multiview display layer 110 are illustrated, by way of example and not limitation. Similarly, different views 14b of a second multiview image 16b are illustrated provided by or display using the directional light beams 102 from the first multiview display layer 110, also by way of example and not limitation. The different views 14a, 14b have different locations within a view zone of the multilayer static multiview display 100 by virtue of the different view directions of the different views 14a, 14b. In some embodiments, the different locations of the different views 14a, 14b of the first and second multiview images 16a, 16b, respectively, may be aligned with one another (i.e., have the same locations within the view zone). For example, the different views 14a, 14b or equivalently the first and second multiview images 16a, 16b may represent different color versions of the same multiview image. As such, a combination of the first and second multiview images 16a, 16b may provide a color multiview images. In other embodiments, the different locations may be shifted or offset from one another. Selectively displaying the first and second multiview images 16a, 16b may facilitate providing an animated or quasi-static multiview image. For example, selective displaying may comprise time-sequential operation of the first and second multiview display layers 110, 120.

Figure 4A:
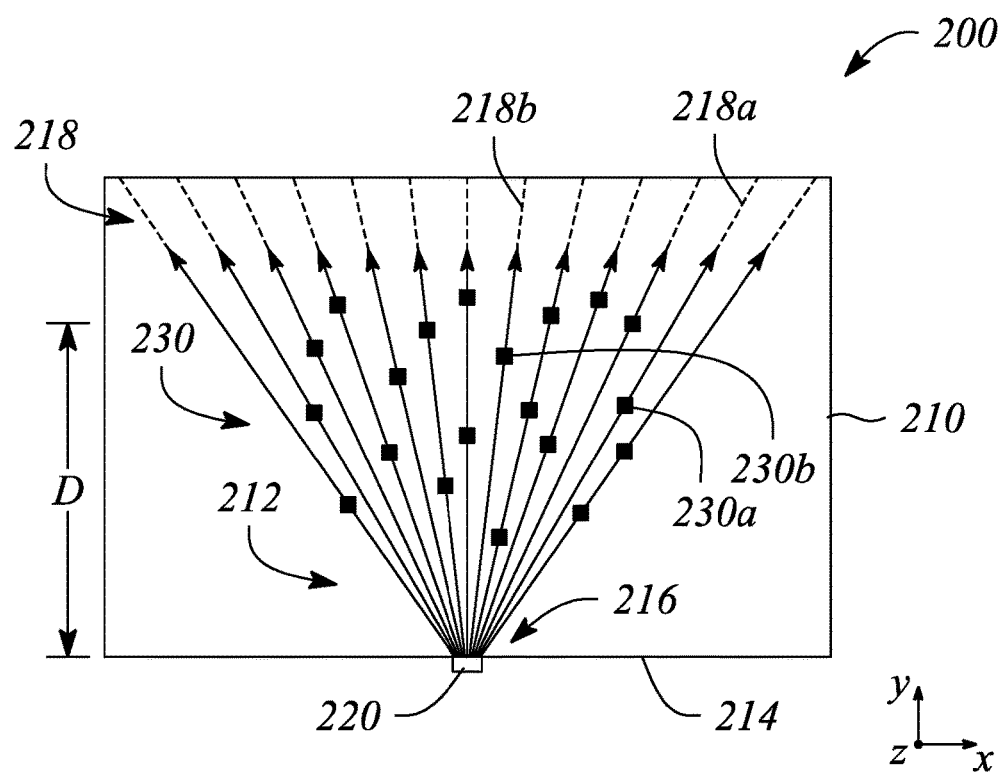
FIG. 4A illustrates a plan view of a multiview display layer in an example, according to an embodiment consistent with the principles described herein.
Figure 4B:
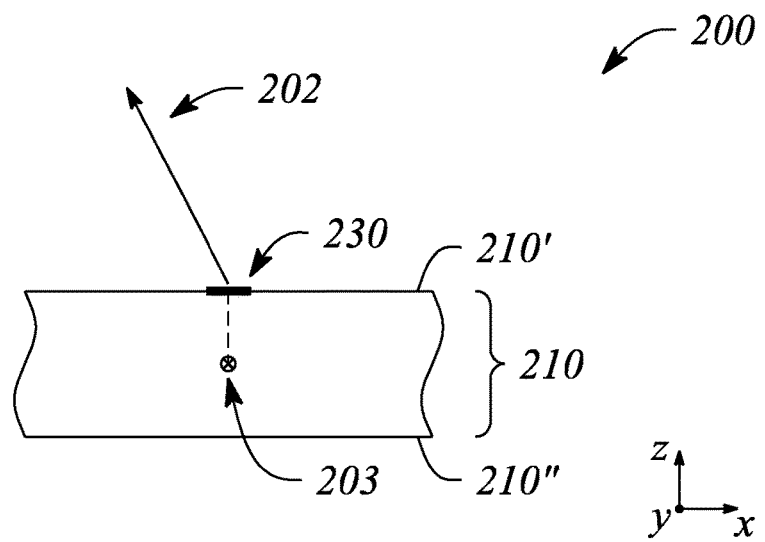
FIG. 4B illustrates a cross-sectional view of a portion of a multiview display layer in an example, according to an embodiment consistent with the principles described herein.
Figure 4C:
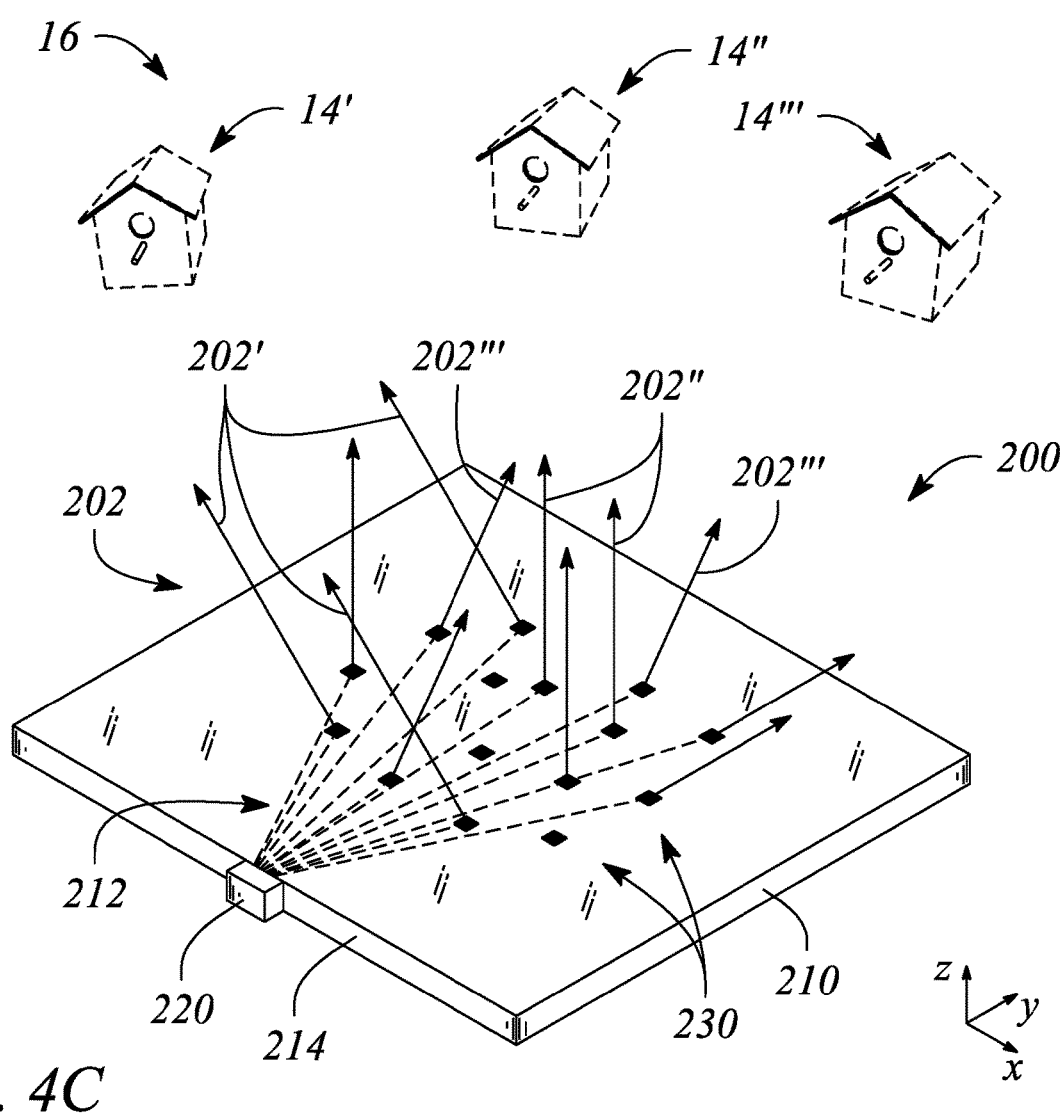
FIG. 4C illustrates a perspective view of a multiview display layer in an example, according to an embodiment consistent with the principles described herein.

According to some embodiments of the principles described herein, a multiview display layer is provided. FIG. 4A illustrates a plan view of a multiview display layer 200 in an example, according to an embodiment consistent with the principles described herein. FIG. 4B illustrates a cross-sectional view of a portion of a multiview display layer 200 in an example, according to an embodiment consistent with the principles described herein. In particular, FIG. 4B may illustrate a cross section through a portion of the multiview display layer 200 of FIG. 4A, the cross section being in an x-z plane. FIG. 4C illustrates a perspective view of a multiview display layer 200 in an example, according to an embodiment consistent with the principles described herein. According to various embodiments, multiview display layer 200 may represent one or both the first multiview display layer 110 and the second multiview display layer 120. For example, the first and second multiview display layers 110, 120 may be substantially similar to one another, each comprising the multiview display layer 200.

According to various embodiments, the multiview display layer 200 illustrated in FIGS. 4A-4C is configured to provide a plurality of directional light beams 202, each directional light beam 202 of the plurality having an intensity and a principal angular direction. Together, the plurality of directional light beams 202 represents various view pixels of a set of views of a multiview image that the multiview display layer 200 is configured to provide or display. In some embodiments, the view pixels may be organized into multiview pixels to represent the various different views of the multiview image. Further, as provided herein, the plurality of directional light beams 202 may equally represent either or both of the directional light beams 102 of the first multiview display layer 110 or the directional light beams 102' of the second multiview display layer 120.

As illustrated, the multiview display layer 200 comprises a light guide 210. The light guide may be a plate light guide (as illustrated), for example. The light guide 210 is configured to guide light along a length of the light guide 210 as guided light or more particularly as guided light beams 212. For example, the light guide 210 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light beams 212 according to one or more guided modes of the light guide 210, for example.

In some embodiments, the light guide 210 may be a slab or plate optical waveguide comprising an extended, substantially planar sheet of optically transparent, dielectric material. The substantially planar sheet of dielectric material is configured to guide the guided light beams 212 using total internal reflection. According to various examples, the optically transparent material of the light guide 210 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 210 may further include a cladding layer (not illustrated) on at least a portion of a surface (e.g., one or both of the top surface and the bottom surface) of the light guide 210. The cladding layer may be used to further facilitate total internal reflection, according to some examples.

According to various embodiments, the light guide 210 is configured to guide the guided light beams 212 according to total internal reflection at a non-zero propagation angle between a first surface 210' (e.g., a 'front' surface) and a second surface 210" (e.g., a 'back' or 'bottom' surface) of the light guide 210. In particular, the guided light beams 212 propagate by reflecting or 'bouncing' between the first surface 210' and the second surface 210" of the light guide 210 at the non-zero propagation angle. Note, the non-zero propagation angle is not explicitly depicted in FIG. 4B for simplicity of illustration. However, FIG. 4B does illustrate an arrow pointing into a plane of the illustration depicting a general propagation direction 203 of the guided light beams 212 along the light guide length.

As defined herein, a 'non-zero propagation angle' is an angle relative to a surface (e.g., the first surface 210' or the second surface 210") of the light guide 210. Further, the non-zero propagation angle is both greater than zero and less than a critical angle of total internal reflection within the light guide 210, according to various embodiments. For example, the non-zero propagation angle of the guided light beam 212 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 210.

As illustrated in FIGS. 4A and 4C, the multiview display layer 200 further comprise a light source 220. The light source 220 is located at an input location 216 on the light guide 210. For example, the light source 220 may be located adjacent to an edge or side 214 of the light guide 210, as illustrated. The light source 220 is configured to provide light within the light guide 210 as the plurality of guided light beams 212. Further, the light source 220 provides the light such that individual guided light beams 212 of the guided light beam plurality have different radial directions 218 from one another.

In particular, light emitted by the light source 220 is configured enter the light guide 210 and to propagate as the plurality of guided light beams 212 in a radial pattern away from the input location 216 and across or along a length of the light guide 210. Further, the individual guided light beams 212 of the guided light beam plurality have different radial directions from one another by virtue of the radial pattern of propagation away from the input location 216. For example, the light source 220 may be butt-coupled to the side 214. The light source 220 being butt-coupled may facilitate introduction of light in a fan-shape pattern to provide the different radial directions of the individual guided light beams 212, for example. According to some embodiments, the light source 220 may be or at least approximate a 'point' source of light at the input location 216 such that the guided light beams 212 propagate along the different radial directions 218 (i.e., as the plurality of guided light beams 212).

In some embodiments, the input location 216 of the light source 220 is on a side 214 of the light guide 210 near or about at a center or a middle of the side 214. In particular, in FIGS. 4A and 4C, the light source 220 is illustrated at an input location 216 that is approximately centered on (e.g., at a middle of) the side 214 (i.e., the 'input side') of the light guide 210. Alternatively (not illustrated), the input location 216 may be away from the middle of the side 214 of the light guide 210. For example, the input location 216 may be at a corner of the light guide 210. For example, the light guide 210 may have a rectangular shape (e.g., as illustrated) and the input location 216 of the light source 220 may be at a corner of the rectangular-shaped light guide 210 (e.g., a corner of the input side 214).

In various embodiments, the light source 220 may comprise substantially any source of light (e.g., optical emitter) including, but not limited to, one or more light emitting diodes (LEDs) or a laser (e.g., laser diode). In some embodiments, the light source 220 may comprise an optical emitter configured produce a substantially monochromatic light having a narrowband spectrum denoted by a particular color. In particular, the color of the monochromatic light may be a primary color of a particular color space or color model (e.g., an RGB color model). In other examples, the light source 220 may be a substantially broadband light source configured to provide substantially broadband or polychromatic light. For example, the light source 220 may provide white light. In some embodiments, the light source 220 may comprise a plurality of different optical emitters configured to provide different colors of light. The different optical emitters may be configured to provide light having different, color-specific, non-zero propagation angles of the guided light corresponding to each of the different colors of light.

In some embodiments, the guided light beams 212 produced by coupling light from the light source 220 into the light guide 210 may be uncollimated or at least substantially uncollimated. In other embodiments, the guided light beams 212 may be collimated (i.e., the guided light beams 212 may be collimated light beams). As such, in some embodiments, the multiview display layer 200 may include a collimator (not illustrated) between the light source 220 and the light guide 210. Alternatively, the light source 220 may further comprise a collimator. The collimator is configured to provide guided light beams 212 within the light guide 210 that are collimated. In particular, the collimator is configured to receive substantially uncollimated light from one or more of the optical emitters of the light source 220 and to convert the substantially uncollimated light into collimated light. In some examples, the collimator may be configured to provide collimation in a plane (e.g., a 'vertical' plane) that is substantially perpendicular to the propagation direction of the guided light beams 212. That is, the collimation may provide collimated guided light beams 212 having a relatively narrow angular spread in a plane perpendicular to a surface of the light guide 210 (e.g., the first or second surface 210', 210"), for example. According to various embodiments, the collimator may comprise any of a variety of collimators including, but not limited to a lens, a reflector or mirror (e.g., tilted collimating reflector), or a diffraction grating (e.g., a diffraction grating-based barrel collimator) configured to collimate the light, e.g., from the light source 220.

Use of collimated or uncollimated light may impact the multiview image that may be provided by the multiview display layer 200, in some embodiments. For example, if the guided light beams 212 are collimated within the light guide 210, the emitted directional light beams 102 may have a relatively narrow or confined angular spread in at least two orthogonal directions. Thus, the multiview display layer 200 may provide a multiview image having a plurality of different views in a array having two different directions (e.g., an x-direction and a y-direction). However, if the guided light beams 212 are substantially uncollimated, the multiview image may provide view parallax, but may not provide a full, two-dimensional array of different views. In particular, if the guided light beams 212 are uncollimated (e.g., along the z-axis), the multiview image may provide different multiview images exhibiting 'parallax 3D' when rotated about the y-axis (e.g., as illustrated in FIG. 1A). On the other hand, if the multiview display layer 200 is rotated around the x-axis, for example, the multiview image and views thereof may remain substantially unchanged or the same because the directional light beams 202 of the directional light beam plurality have a broad angular range within the y-z plane. Thus, the multiview image provided may be 'parallax only' providing an array of views in only one direction and not two.

The multiview display layer 200 illustrated in FIGS. 4A-4C further comprises a plurality of diffraction gratings 230 configured to emit directional light beams 202 of the directional light beam plurality. As mentioned above and according to various embodiments, the directional light beams 202 emitted by the plurality of diffraction gratings 230 may represent a multiview image. In particular, the directional light beams 202 emitted by the plurality of diffraction gratings 230 may be configured to create the multiview image to display information, e.g., information having 3D content. Further, the diffraction gratings 230 may emit the directional light beams 202 when the light guide 210 is illuminated from the side 214 by the light source 220, as is further described below.

According to various embodiments, a diffraction grating 230 of the diffraction grating plurality are configured to provide from a portion of a guided light beam 212 of the guided light beam plurality a directional light beam 202 of the directional light beam plurality. Further, the diffraction grating 230 is configured to provide the directional light beam 202 having both an intensity and a principal angular direction corresponding to an intensity and a view direction of a view pixel of the multiview image. In some embodiments, the diffraction gratings 230 of the diffraction grating plurality generally do not intersect, overlap or otherwise touch one another, according to some embodiments. That is, each diffraction grating 230 of the diffraction grating plurality is generally distinct and separated from other ones of the diffraction gratings 230, according to various embodiments.

As illustrated in FIG. 4B, the directional light beams 202 may, at least in part, propagate in a direction that differs from and in some embodiments is orthogonal to an average or general propagation direction 203 of a guided light beams 212 within the light guide 210. For example, as illustrated in FIG. 4B, the directional light beam 202 from a diffraction grating 230 may be substantially confined to the x-z plane, according to some embodiments.

According to various embodiments, each of the diffraction gratings 230 of the diffraction grating plurality has an associated grating characteristic. The associated grating characteristic of each diffraction grating depends on, is defined by, or is a function of a radial direction 218 of the guided light beam 212 incident on the diffraction grating from the light source 220. Further, in some embodiment, the associated grating characteristic is further determined or defined by a distance between the diffraction grating 230 and the input location 216 of the light source 220. For example, the associated characteristic may be a function of the distance D between diffraction grating 230a and input location 216 and the radial direction 218a of the guided light beam 212 incident on the diffraction grating 230a, as illustrated in FIG. 4A. Stated differently, an associated grating characteristic of a diffraction grating 230 in the plurality of the diffraction gratings 230 depends on the input location 216 of the light source and a particular location of the diffraction grating 230 on a surface of the light guide 210 relative to the input location 216.

FIG. 4A illustrates two different diffraction gratings 230a and 230b having different spatial coordinates ($x_1$, $y_1$) and ($x_2$, $y_2$), which further have different grating characteristics to compensate or account for the different radial directions 218a and 218b of the plurality of guided light beams 212 from the light source 220 that are incident on the diffraction gratings 230. Similarly, the different grating characteristics of the two different diffraction gratings 230a and 230b account for different distances of the respective diffraction gratings 230a, 230b from the light source input location 216 determined by the different spatial coordinates ($x_1$, $y_1$) and ($x_2$, $y_2$).

FIG. 4C illustrates an example of a plurality of directional light beams 102 that may be provided by the multiview display layer 200. In particular, as illustrated, different sets of diffraction gratings 230 of the diffraction grating plurality are illustrated emitting directional light beams 202 having different principal angular directions from one another. The different principal angular directions may correspond to different view directions of the multiview display layer 200, according to various embodiments. For example, a first set of the diffraction gratings 230 may diffractively couple out portions of incident guided light beams 212 (illustrated as dashed lines) to provide a first set of directional light beams 202' having a first principal angular direction corresponding to a first view direction (or a first view) of the multiview display layer 200. Similarly, a second set of directional light beams 202" and a third set of directional light beams 202'" having principal angular directions corresponding to a second view direction (or a second view) and a third view direction (or third view), respectively of the multiview display layer 200 may be provided by diffractive coupling out of portions of incident guided light beams 212 by respective second and third sets of diffraction gratings 230, and so on, as illustrated. Also illustrated in FIG. 4C are a first view 14', a second view 14", and a third view 14'", of a multiview image 16 that may be provided by the multiview display layer 200. The illustrated first, second, and third views 14', 14", 14'", represent different perspective views of an object and collectively are the displayed multiview image 16 (e.g., equivalent to the multiview image 16 illustrated in FIG. 1A).

In general, the grating characteristic of a diffraction grating 230 may include one or more of a diffractive feature spacing or pitch, a grating orientation and a grating size (or extent) of the diffraction grating. Further, in some embodiments, a diffraction-grating coupling efficiency (such as the diffraction-grating area, the groove depth or ridge height, etc.) may be a function of the distance from the input location 216 to the diffraction grating. For example, the diffraction grating coupling efficiency may be configured to increase as a function of distance, in part, to correct or compensate for a general decrease in the intensity of the guided light beams 212 associated with the radial spreading and other loss factors. Thus, an intensity of the directional light beam 202 provided by the diffraction grating 230 and corresponding to an intensity of a corresponding view pixel may be determined, in part, by a diffractive coupling efficiency of the diffraction grating 230, according to some embodiments.

Figure 5:
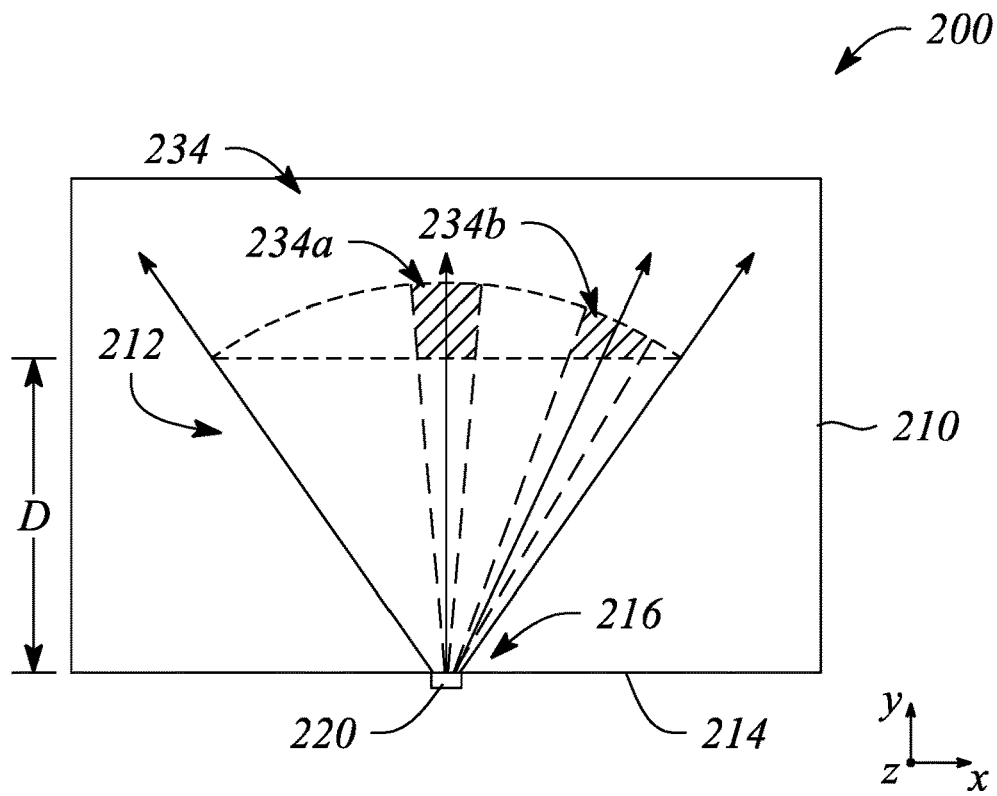
FIG. 5 illustrates a plan view of a multiview display layer in an example, according to an embodiment consistent with the principles described herein.

FIG. 5 illustrates a plan view of a multiview display layer 200 in an example, according to an embodiment consistent with the principles described herein. In FIG. 5, illumination volumes 234 in an angular space that is a distance D from input location 216 of the light source 220 at the side 214 of the light guide 210 are shown. Note that the illumination volume has a wider angular size as the radial direction of propagation of the plurality of guided light beams 212 changes in angle away from the y-axis and towards the x-axis. For example, illumination volume 234b is wider than illumination volume 234a, as illustrated.

Referring again to FIG. 4B, the plurality of diffraction gratings 230 may be located at or adjacent to the first surface 210' of the light guide 210, which is the light beam emission surface of the light guide 210, as illustrated. For example, the diffraction gratings 230 may be transmission mode diffraction gratings configured to diffractively couple out the guided light portion through the first surface 210' as the directional light beams 202. Alternatively, the plurality of diffraction gratings 230 may be located at or adjacent to the second surface 210" opposite from a light beam emission surface of the light guide 210 (i.e., the first surface 210'). In particular, the diffraction gratings 230 may be reflection mode diffraction gratings. As reflection mode diffraction gratings, the diffraction gratings 230 are configured to both diffract the guided light portion and to reflect the diffracted guided light portion toward the first surface 210' to exit through the first surface 210' as the diffractively scattered or coupled-out directional light beams 202. In other embodiments (not illustrated), the diffraction gratings 230 may be located between the surfaces of the light guide 210, e.g., as one or both of a transmission mode diffraction grating and a reflection mode diffraction grating.

In some embodiments described herein, the principal angular directions of the directional light beams 202 may include an effect of refraction due to the directional light beams 202 exiting the light guide 210 at a light guide surface. For example, when the diffraction gratings 230 are located at or adjacent to second surface 210", the directional light beams 202 may be refracted (i.e., bent) because of a change in refractive index as the directional light beams 202 cross the first surface 210', by way of example and not limitation.

According to some embodiment, the multiview display layer 200 may comprise a plurality of light sources 220 that are laterally offset from one another. The lateral offset of light sources 220 of the light source plurality may provide a difference in the radial directions of various guided light beams 212 at or between individual diffraction gratings 230. The difference, in turn, may facilitate providing animation of a displayed multiview image, according to some embodiments. Thus, the multiview display layer 200 may be a quasi-static multiview display layer, in some embodiments.

Figure 6A:
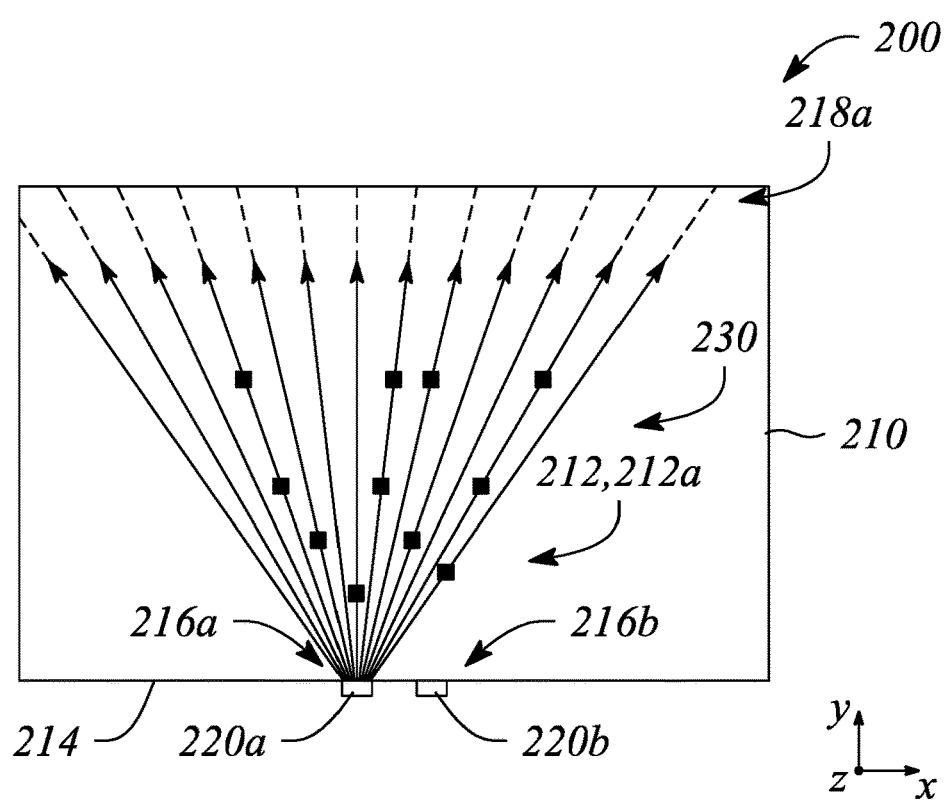
FIG. 6A illustrates a plan view of a multiview display layer in an example, according to an embodiment consistent with the principles described herein.
Figure 6B:
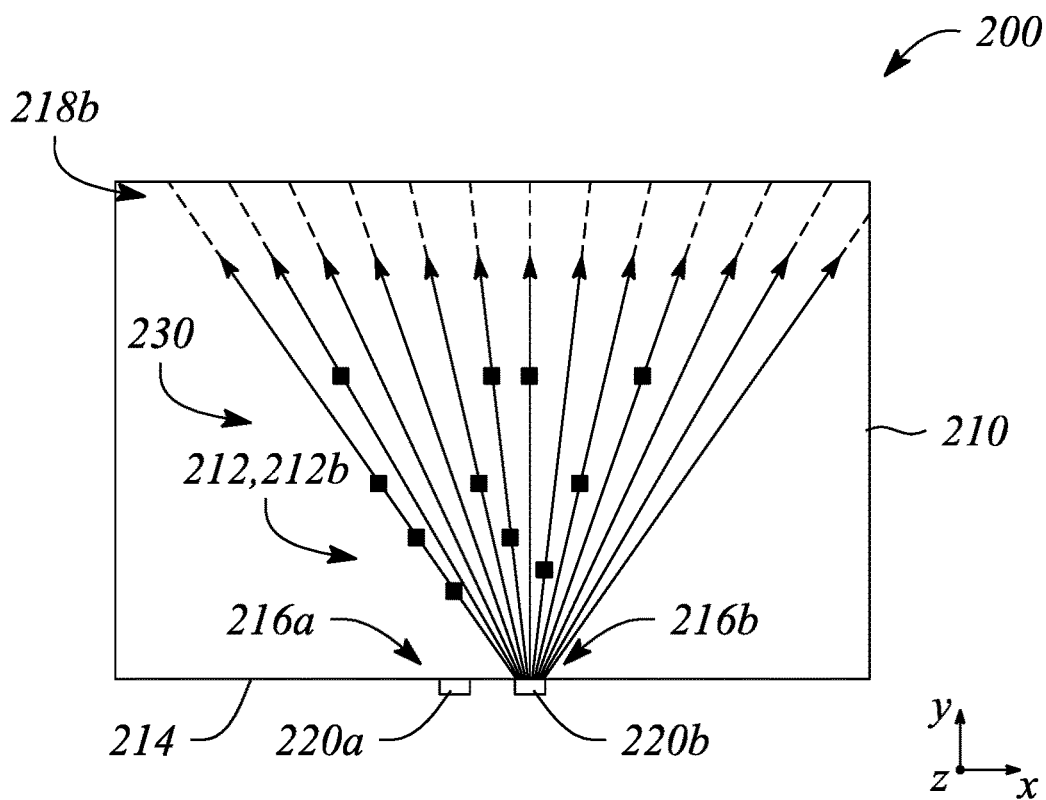
FIG. 6B illustrates a plan view of the multiview display layer of FIG. 6A in another example, according to an embodiment consistent with the principles described herein.

FIG. 6A illustrates a plan view of a multiview display layer 200 in an example, according to an embodiment consistent with the principles described herein. FIG. 6B illustrates a plan view of the multiview display layer 200 of FIG. 6A in another example, according to an embodiment consistent with the principles described herein. The multiview display layer 200 illustrated in FIGS. 6A and 6B comprises a light guide 210 with a plurality of diffraction gratings 230. In addition, the multiview display layer 200 further comprises a plurality of light sources 220 that are laterally offset from each other and configured to separately provide guided light beams 212 having different radial directions 218 from one another, as illustrated.

In particular, FIGS. 6A and 6B illustrate a first light source 220a at a first input location 216A and a second light source 220b at a second input location 216B on the side 214 of the light guide 210. The first and second input locations 216A, 216B are laterally offset or shifted from one another along the side 214 (i.e., in an x-direction) to provide the lateral offset of respective first and second light sources 220a, 220b. Additionally, each of the first and second light sources 220a, 220b of the plurality of light sources 220 provide a different plurality of guided light beams 212 having respective different radial directions from one another. For example, the first light source 220a may provide a first plurality of guided light beams 212a having a first set of different radial directions 218a and the second light source 220b may provide a second plurality of guided light beams 212b having a second set of different radial directions 218b, as illustrated in FIGS. 6A and 6B, respectively. Further, the first and second pluralities of guided light beams 212a, 112b generally have sets of different radial directions 218a, 218b that also differ from one another as sets by virtue of the lateral offset of the first and second light sources 220a, 220b, as illustrated.

Thus, the plurality of diffraction gratings 230 emit directional light beams representing different multiview images that are shifted in a view space from one another (e.g., angularly shifted in view space). Thus, by switching between the first and second light sources 220a, 220b, the multiview display layer 200 may provide 'animation' of the multiview images, such as a time-sequenced animation. In particular, by sequentially illuminating the first and second light sources 220a, 220b during different sequential time intervals or periods, multiview display layer 200 may be configured to shift an apparent location of the multiview image during the different time periods, for example. This shift in apparent location provided by the animation may represent and example of operating the multiview display layer 200 as a quasi-static multiview display layer to provide a plurality of multiview image states, according to some embodiments.

According to various embodiments, as described above with respect to FIGS. 4A-4C, the directional light beams 202 of the multiview display layer 200 are emitted using diffraction (e.g., by diffractive scattering or diffractive coupling). In some embodiments, the plurality of the diffraction gratings 230 may be organized as multiview pixels, each multiview pixel including a set of diffraction gratings 230 comprising one or more diffraction gratings 230 from the diffraction grating plurality. Further, as has been discussed above, the diffraction grating(s) 230 have diffraction characteristics that are a function of radial location on the light guide 210 as well as being a function of an intensity and direction of the directional light beams 202 emitted by the diffraction grating(s) 230.

Referring again to FIG. 3B, light sources 112, 122 are illustrated associated respectively with each of the first and second multiview display layers 110, 120, by way of example and not limitation. According to some embodiments, the light sources 112, 122 may be substantially similar to the light source 220 of the multiview display layer 200, described above. In particular, as illustrated, the light sources 112, 122 are on a common side of the each of the first and second multiview display layers 110, 120. Further, light sources 112, 122 are aligned vertically with one another. In other embodiments (not illustrated), the light sources 112, 122 may be on the common side, but laterally offset from one another. In some examples, lateral offset of the light sources 112, 122 may provide better heat management since the light sources 112, 122 are not immediately adjacent. In other embodiments (not illustrated), the light sources 112, 122 may be on different sides of the first and second multiview display layers 110, 120, respectively. For example, the light sources 112, 122 may be located on opposite sides or on orthogonal sides of the first and second multiview display layers 110, 120. Locating the light sources 112, 122 on sides of the first and second multiview display layers 110, 120 that are orthogonal to one another may provide a displayed multiview image parallax that is different (e.g., y-directed and x-directed) for each of the first and second multiview display layers 110, 120, for example.

Figure 7A:
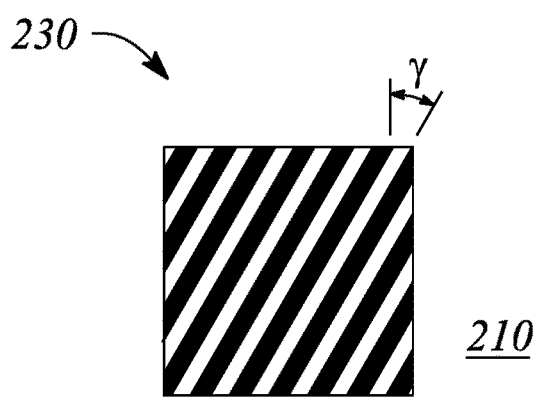
FIG. 7A illustrates a plan view of a diffraction grating of a multiview display layer in an example, according to an embodiment consistent with the principles described herein.
Figure 7B:
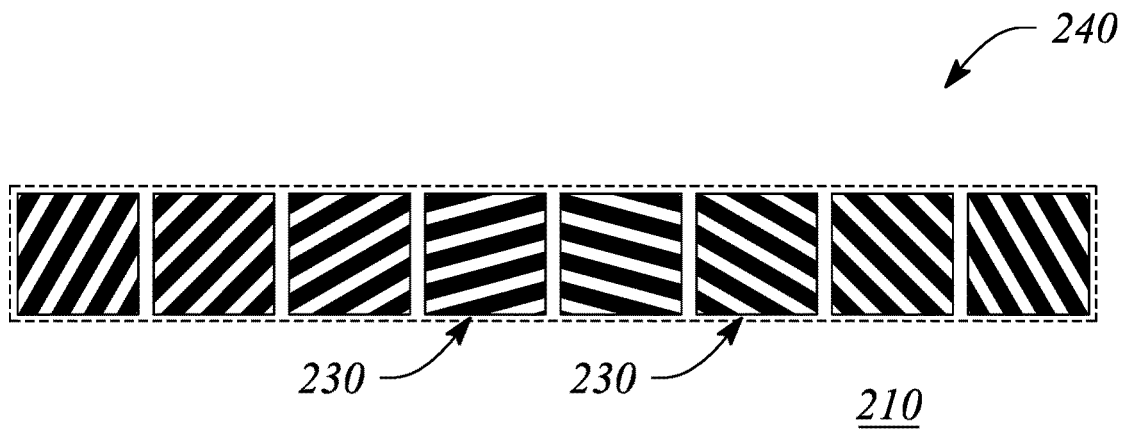
FIG. 7B illustrates a plan view of a set of diffraction gratings organized as a multiview pixel of a multiview display layer in an example, according to another embodiment consistent with the principles described herein.

FIG. 7A illustrates a plan view of a diffraction grating 230 of a multiview display layer 200 in an example, according to an embodiment consistent with the principles described herein. FIG. 7B illustrates a plan view of a set of diffraction gratings 230 organized as a multiview pixel 240 of a multiview display layer 200 in an example, according to another embodiment consistent with the principles described herein. As illustrated in FIGS. 7A and 7B, each of the diffraction gratings 230 comprises a plurality of diffractive features spaced apart from one another according to a diffractive feature spacing (which is sometimes referred to as a 'grating spacing') or grating pitch. The diffractive feature spacing or grating pitch is configured to provide diffractive coupling out or scattering of the guided light portion from within the light guide. In FIGS. 7A-7B, the diffraction gratings 230 are on a surface of a light guide 210 of the multiview display (e.g., the multiview display layer 200 illustrated in FIGS. 4A-4C).

According to various embodiments, the spacing or grating pitch of the diffractive features in the diffraction grating 230 may be sub-wavelength (i.e., less than a wavelength of the guided light beams 212). Note that, while FIGS. 7A and 7B illustrate the diffraction gratings 230 having a single or uniform grating spacing (i.e., a constant grating pitch), for simplicity of illustration. In various embodiments, as described below, the diffraction grating 230 may include a plurality of different grating spacings (e.g., two or more grating spacings) or a variable diffractive feature spacing or grating pitch to provide the directional light beams 202, e.g., as is variously illustrated in FIGS. 4A-6B. Consequently, FIGS. 7A and 7B are not intended to imply that a single grating pitch is an exclusive embodiment of diffraction grating 230.

According to some embodiments, the diffractive features of the diffraction grating 230 may comprise one or both of grooves and ridges that are spaced apart from one another. The grooves or the ridges may comprise a material of the light guide 210, e.g., the groove or ridges may be formed in a surface of the light guide 210. In another example, the grooves or the ridges may be formed from a material other than the light guide material, e.g., a film or a layer of another material on a surface of the light guide 210.

As discussed previously and shown in FIG. 7A, the configuration of the diffraction features comprises a grating characteristic of the diffraction grating 230. For example, a grating depth of the diffraction grating may be configured to determine the intensity of the directional light beams 102 provided by the diffraction grating 230. Alternatively or additionally, discussed previously and shown in FIGS. 7A-7B, the grating characteristic comprises one or both of a grating pitch of the diffraction grating 230 and a grating orientation (e.g., the grating orientation γ illustrated in FIG. 7A). In conjunction with the angle of incidence of the guided light beams, these grating characteristics determine the principal angular direction of the directional light beams 202 provided by the diffraction grating 230.

In some embodiments (not illustrated), the diffraction grating 230 configured to provide the directional light beams comprises a variable or chirped diffraction grating as a grating characteristic. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multiview pixel may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In other embodiments, diffraction grating 230 configured to provide the directional light beams 202 is or comprises a plurality of diffraction gratings (e.g., sub-gratings). For example, the plurality of diffraction gratings of the diffraction grating 230 may comprise a first diffraction grating configured to provide a red portion of the directional light beams 202. Further, the plurality of diffraction gratings of the diffraction grating 230 may comprise a second diffraction grating configured to provide a green portion of the directional light beams 202. Further still, the plurality of diffraction gratings of the diffraction grating 230 may comprise a third diffraction grating configured to provide a blue portion of the directional light beams 202. In some embodiments, individual diffraction gratings of the plurality of diffraction gratings may be superimposed on one another. In other embodiments, the diffraction gratings may be separate diffraction gratings arranged next to one another, e.g., as an array.

More generally, the multiview display layer 200 may comprise one or more instances of multiview pixels 240, which each comprise sets of diffraction gratings 230 from the plurality of diffraction gratings 230. As shown in FIG. 7B, the diffraction gratings 230 of the set that makes up a multiview pixel 240 may have different grating characteristics. The diffraction gratings 230 of the multiview pixel may have different grating orientations, for example. In particular, the diffraction gratings 230 of the multiview pixel 240 may have different grating characteristics determined or dictated by a corresponding set of views of a multiview image. For example, the multiview pixel 240 may include a set of eight (8) diffraction gratings 230 that, in turn, correspond to 8 different views of the multiview display layer 200. Moreover, the multiview display layer 200 may include multiple multiview pixels 240. For example, there may be a plurality of multiview pixels 240 with sets of diffraction gratings 230, each multiview pixels 240 corresponding to a different one of 2048×1024 pixels in each of the 8 different views.

In some embodiments, multiview display layer 200 may be transparent or substantially transparent. In particular, the light guide 210 and the spaced apart plurality of diffraction gratings 230 may allow light to pass through the light guide 210 in a direction that is orthogonal to both the first surface 210' and the second surface 210", in some embodiments. Thus, the light guide 210 and more generally the multiview display layer 200 may be transparent to light propagating in the direction orthogonal to the general propagation direction 203 of the guided light beams 212 of the guided light beam plurality. Further, the transparency may be facilitated, at least in part, by the substantially transparency of the diffraction gratings 230.

Referring again to FIGS. 3A-3B, the multilayer static multiview display 100 may further comprise a spacer 130 between the first multiview display layer 110 and the second multiview display layer 120. The spacer 130 may serve to prevent interference (e.g., light leakage) between light guides of the first and second multiview display layers 110, for example. In particular, the spacer 130 may have a refractive index that is lower than a refractive index of a light guide (e.g., light guide 210) of the each of the first and second multiview display layers 110, 120, according to some embodiments. For example, the spacer layer may comprise one or more of air, a low refractive index optical tape or similar optical adhesive. In some embodiments, as mentioned above, the multilayer static multiview display 100 may be configured to provide color multiview images. In particular, the first multiview display layer 110 may be configured to emit directional light beams 102 comprising a light of a first color and the second multiview display layer is configured to emit directional light beams 102' comprising a light of second color. Further, the first and second colors being different from one another. The directional light beams 102, 102' may be combined to provide a color multiview image (e.g., perhaps with a third color, as discussed below), for example. In other examples, the directional light beams 102, 102' may be provided in a time-sequential manner allowing multiview images of different colors to be provided in different time intervals.

In some embodiments (not illustrated), the multilayer static multiview display 100 may further comprise a third multiview display layer. The third multiview display layer may be configured to emit directional light beams configured to emit directional light beams representing a third multiview image by diffractive scattering light from a radial pattern of guided light beams within the third multiview layer, according to these embodiments. In some embodiments, the second multiview display layer 120 may be located between the third multiview display layer and the first multiview display layer 110. For example, the third multiview display layer may be located adjacent to a light emission surface of the second multiview display layer 120 of the multilayer static multiview display 100 illustrated in FIGS. 3A-3B. Further, the third multiview display layer may be substantially similar to the second multiview display layer 120, in some embodiments. For example, the third multiview display layer may be configured to be transparent to both the first multiview image and the second multiview image, e.g., to facilitate viewing the first and second multiview images through the third multiview display layer.

In some embodiments that include the third multiview layer, each of the three multiview layers may be configured to emit directional light beams having a different color of a color model (e.g., an RGB color model). For example, the first multiview display layer may be configured to emit directional light beams comprising red light, the second multiview display layer is configured to emit directional light beams comprising green light, and the third multiview display layer is configured to emit directional light beams comprising blue light. As such, the multilayer static multiview display 100 may be configured to display a color multiview image comprising a composite of the first multiview image, the second multiview image and a third multiview image provided by the third multiview layer.

Figure 8:
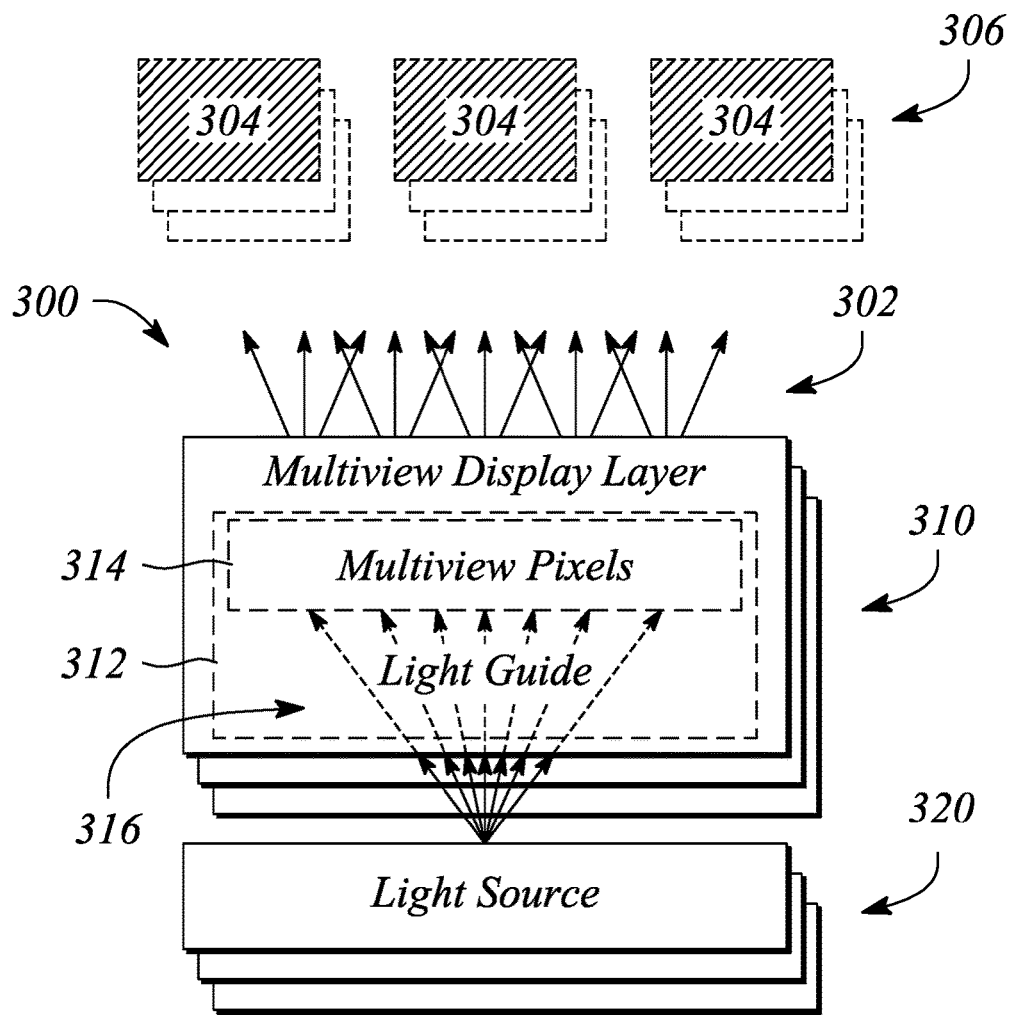
FIG. 8 illustrates a block diagram of a multiview display in an example, according to an embodiment consistent with the principles described herein.

In accordance with some embodiments of the principles described herein, a multiview display is provided. FIG. 8 illustrates a block diagram of a multiview display 300 in an example, according to an embodiment consistent with the principles described herein. As illustrated, the multiview display 300 is configured to provide directional light beams 302 representing a plurality of different views 304 of a plurality of multiview images 306. The plurality of different views 304 have different view directions and associated different view locations within a view zone of the multiview display 300, according to various embodiments. In some examples, the plurality of different views 304 may provide a 'glasses free' (e.g., autostereoscopic) representation of information in the multiview images 306 of the multiview image plurality being displayed by the multiview display 300. Further, in some examples, the multiview display 300 may be configured to provide a color multiview image, e.g., as a combination or composite of multiview images 306 of the multiview image plurality. Further, the multiview display 300 may be configured to provide multiview images 306 of the multiview image plurality that is either animated or quasi-static, in some examples.

In particular, the plurality of directional light beams 302 emitted by the multiview display 300 may correspond to pixels of the different views 304 (i.e., view pixels). According to various embodiments, the directional light beams 302 may be static or quasi-static (i.e., not actively modulated) and may include different colors of light. For example, the multiview display 300 may either provide or not provide the directional light beams 302. Further, an intensity of the provided directional light beams 302 along with a direction of those directional light beams 302 may define a view pixel of the multiview image 306 being displayed by the multiview display 300 (e.g., static multiview display), according to various embodiments.

As illustrated in FIG. 8, the multiview display 300 comprises a plurality of multiview display layers 310. The multiview display layers 310 are configured to provide the plurality of multiview images 306. According to various embodiments, each multiview display layer 310 comprises a light guide 312 having an array of multiview pixels 314. A multiview pixel 314 of the multiview pixel array, in turn, comprises a set or plurality of diffraction gratings. The diffraction grating plurality of the multiview pixel 314 is configured to diffractively scattering light from a radial pattern of guided light beams 316 within the light guide 312. The light is diffractively scattered by the diffraction gratings as a plurality of directional light beams 302 of the directional light beams 302 and represents view pixels of a multiview image 306 of the multiview image plurality, according to various embodiments.

In some embodiments, a multiview display layer 310 of the multiview display layer plurality may be substantially similar to the first and second multiview display layers 110, 120 described above with respect to the multilayer static multiview display 100 as well as the multiview display layer 200, also described above. In particular, the light guide 312 of the multiview display layer 310 may be substantially similar to the light guide 210, while the diffraction gratings of the multiview pixel 314 may be substantially similar to the diffraction gratings 230, in some embodiments. Further, in some embodiments, and the multiview pixel 314 may be substantially similar to the multiview pixel 240 described above with respect to the multiview display layer 200.

In particular, a principal angular direction of a directional light beam 302 provided by a diffraction grating of the diffraction grating plurality may be determined by a grating characteristic of the diffraction grating. The grating characteristic may comprises one or both of a grating pitch and a grating orientation of the diffraction grating, for example. Further, the grating characteristic may be a function of a relative location of the diffraction grating and a point of origin of the radial pattern of guided light beams 316 within the multiview display layer 310. For example, the point of origin may be on a side of the light guide 312, e.g., substantially similar to the side 214 of the light guide 210, described above.

In some embodiments, the light guide 312 of the multiview display layer 310 may be transparent in a direction orthogonal to a direction of propagation of the radial pattern of guided light beams 316 within the light guide. For example, a multiview display layer 310 of the multiview display layer plurality may be transparent or at least substantially transparent to directional light beams 302 provided by other multiview display layer 310 to facilitate transmission of those directional light beams 302 through a thickness of the multiview display layer 310 and viewing of the multiview image(s) represented by these directional light beams 302.

The multiview display 300 illustrated in FIG. 8 further comprises a plurality of light sources 320. According to various embodiments, each light source 320 of the light source plurality is configured to provide the radial pattern of guided light beams 316 within the light guide of a different one of the multiview display layers. In some embodiments, the light source 320 may be substantially similar to the light source 220 of the above-described multiview display layer 200. Moreover, the light source 320 may represent the point of origin of the radial pattern of guided light beams 316, e.g., as described above with respect to the light source 220 located at the input location 216 on the light guide 210. In particular, the provided light (e.g., illustrated by arrows emanating from the light source 320 in FIG. 8) is guided by the light guide 312 as a plurality of guided light beams 316. The guided light beams 316 of the guided light beam plurality have different radial directions from one another within the light guide 312, according to various embodiments. For example, the light sources 320 may be butt-coupled to an input edge of the light guide 312. The light sources 320 may radiate light in a fan-shape or radial pattern to provide the plurality of guided light beams 316 having the different radial directions. Further, the plurality of light sources 320 may comprise light sources 320 of different colors (i.e., may be configured to provide light of different colors), and the multiview image plurality may represent a composite color multiview image including multiview images (e.g., static multiview images) having the different colors.

Figure 9:
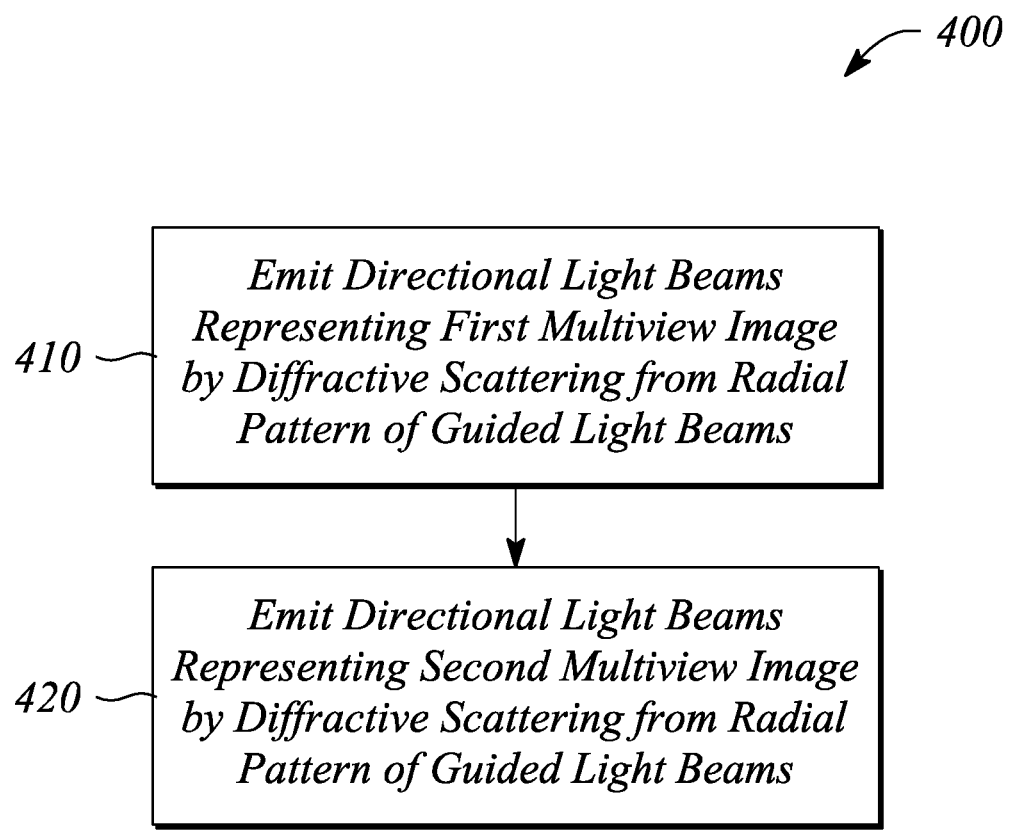
FIG. 9 illustrates a flow chart of a method of multilayer multiview display operation in an example, according to an embodiment consistent with the principles described herein.

In accordance with other embodiments of the principles described herein, a method of multilayer multiview display operation is provided. In some embodiments, the method of multilayer multiview display operation may provide operation of a multilayer static multiview display. FIG. 9 illustrates a flow chart of a method 400 of multilayer static multiview display operation in an example, according to an embodiment consistent with the principles described herein. The method 400 of multilayer static multiview display operation may be used to provide one or more of a plurality of static multiview images, and a quasi-static multiview image, and a color static multiview image, according to various embodiments.

As illustrated in FIG. 9, the method 400 of multilayer static multiview display operation comprises emitting 410 directional light beams representing a first multiview image by diffractive scattering light from a radial pattern of guided light beams within a first multiview layer. The method 400 of multilayer static multiview display operation further comprises emitting 420 directional light beams representing a second static multiview image by diffractive scattering light from a radial pattern of guided light beams within the second multiview display layer. According to various embodiments, the second multiview display layer is adjacent to an emission surface of the first multiview display layer and the emitted directional light beams representing the first multiview image pass through the second multiview display layer.

According to various embodiments, emitting 410, 420 directional light beams representing one or both of the first multiview image and the second multiview image may comprise guiding in a light guide a plurality of guided light beams having a common point of origin and different radial directions from one another. In particular, a guided light beam of the guided light beam plurality has, by definition, a different radial direction of propagation from another guided light beam of the guided light beam plurality. Further, each of the guided light beams of the guided light beam plurality has, by definition, a common point of origin. The point of origin may be a virtual point of origin (e.g., a point beyond an actual point of origin of the guided light beam), in some embodiments. For example, the point of origin may be outside of the light guide and thus be a virtual point of origin. According to some embodiments, the light guide along which the light is guided as well as the guided light beams that are guided therein may be substantially similar to the light guide 210 and guided light beams 212, respectively, as described above with reference to the multiview display layer 200.

According to various embodiments, emitting 410, 420 directional light beams representing one or both of the first multiview image and the second multiview image may further comprise diffractively scattering the light out of the light guide as a plurality of directional light beams using a plurality of diffraction gratings. A diffraction grating of the diffraction grating plurality diffractively couples or scatters out light from the guided light beam plurality as a directional light beam of the directional light beam plurality having an intensity and a principal angular direction of a corresponding view pixel of one of the first or second static multiview images. The intensity and principal angular direction of the emitted directional light beam are controlled by a grating characteristic of the diffraction grating that is based on a location of the diffraction grating relative to the common origin point, according to various embodiments.

In some embodiments, each of the diffraction gratings of the diffraction grating plurality provides (e.g., emits 410, 420 by diffractive scattering) a single directional light beam in a single principal angular direction and having a single intensity corresponding to a particular view pixel in one view of the multiview image. In some embodiments, the diffraction grating comprises a plurality of diffraction grating (e.g., sub-gratings). Further, a set of diffraction gratings may be arranged as a multiview pixel of the static multiview display, in some embodiments.

In various embodiments, the intensity and principal angular direction of the emitted 410, 420 directional light beams are controlled by a grating characteristic of the diffraction grating that is based on (i.e., is a function of) a location of the diffraction grating relative to the common origin point. In particular, grating characteristics of the plurality of diffraction gratings may be varied based on, or equivalently may be a function of, radial directions of incident guided light beams at the diffraction gratings, a distance from the diffraction gratings to a light source that provides the guided light beams, or both.

According to some embodiments, the plurality of diffraction gratings may be substantially similar to the plurality of diffraction gratings 230 of the multiview display layer 200, described above. Further, in some embodiments, the emitted 410, 420 directional light beams may be substantially similar to the plurality of directional light beams 102, 202 also described above. For example, the grating characteristic controlling the principal angular direction may comprise one or both of a grating pitch and a grating orientation of the diffraction grating. Further, an intensity of the directional light beam provided by the diffraction grating and corresponding to an intensity of a corresponding view pixel may be determined by a diffractive coupling efficiency of the diffraction grating. That is, the grating characteristic controlling the intensity may comprise a grating depth of the diffraction grating, a size of the gratings, etc., in some examples.

In some embodiments, the method 400 of multilayer static multiview display operation further comprises providing light to be guided as the plurality of guided light beams using a light source. In particular, light is provided to the light guide as the guided light beams having a plurality of different radial directions of propagation using the light source. According to various embodiments, the light source used in providing light is located at a side of the light guide, the light source location being the common origin point of the guided light beam plurality. In some embodiments, the light source may be substantially similar to the light source(s) 220 of the multiview display layer 200, described above. In particular, the light source may be butt-coupled to an edge or side of the light guide. Further, the light source may approximate a point source representing the common point of origin, in some embodiments.

In some embodiments (not illustrated), the method of static multiview display operation further comprises animating the multiview image by guiding a first plurality of light guided light beams during a first time period and guiding a second plurality of guided light beams during a second time period during a second period. The first guided light beam plurality may have a common origin point that differs from a common origin point of the second guided light beam plurality. For example, the light source may comprise a plurality of laterally offset light sources, e.g., configured to provide animation, as described above. Animation may comprise a shift in an apparent location of the multiview image during the first and second time periods, according to some embodiments.

In some embodiments, the provided light is substantially uncollimated. In other embodiments, the provided light may be collimated (e.g., the light source may comprise a collimator). In various embodiments, the provided light may be the guided having the different radial directions at a non-zero propagation angle within the light guide between surfaces of the light guide. When collimated within the light guide, the provided light may be collimated according to a collimation factor to establish a predetermined angular spread of the guided light within the light guide.

In some embodiments (not illustrated), the method 400 of multilayer static multiview display operation further comprises providing a composite color multiview image. Providing a composite color multiview image may comprise emitting 410 directional light beams of a first color representing the first multiview image using the first multiview layer and emitting 420 directional light beams of a second color representing the second multiview image using the second multiview layer. A third multiview layer may be used to provide emitted directional light beams of a third color. The first, second and third colors may represent red, green and blue (e.g., of an RGB color model), for example. Providing a composite the first and second multiview images further comprises combining the first and second multiview images (and the third if present) to provide the composite color multiview image.

Thus, there have been described examples and embodiments of a multilayer static multiview display and a method of static multiview display operation having diffraction gratings in a plurality of multiview display layers, the diffraction gratings being configured to provide a plurality of directional light beams representing a static or quasi-static multiview image from guided light beams having different radial directions from one another. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multilayer static multiview display comprising:
a first multiview display layer configured to emit guide light as guided light that propagates within the first multiview display layer as a radial pattern of guided light beams,
the first multiview display layer including a plurality of diffraction gratings that are configured to diffractively scatter at least some of the guided light out of the first multiview display layer to form a respective plurality of directional light beams,
the plurality of directional light beams having at least three different directions that correspond to different view directions of at least three different views of a first static multiview image,
each directional light beam having an intensity and a principal angular direction that correspond to an intensity and a view direction of a single view pixel of the first static multiview image; and
a second multiview display layer configured to emit guide light as second guided light that propagates within the second multiview display layer as a radial pattern of guided light beams,
the second multiview display layer including a second plurality of diffraction gratings that are configured to diffractively scatter at least some of the second guided light out of the second multiview display layer to form a respective plurality of second directional light beams,
the second directional light beams having at least three different directions that correspond to different view directions of at least three different views of a second static multiview image,
each second directional light beam having an intensity and a principal angular direction that correspond to an intensity and a view direction of a single view pixel of the second static multiview image,
wherein the second multiview display layer is adjacent to an emission surface of the first multiview display layer and configured to be transparent to the first static multiview image.

2. The multilayer static multiview display of claim 1, one or both of the first multiview display layer and the second multiview display layer comprising:
a light guide configured to guide the radial pattern of guided light beams; and
a light source at an input location on the light guide, the light source being configured to provide within the light guide as the radial pattern of guided light beams a plurality of guided light beams having different radial directions from one another.

3. The multilayer static multiview display of claim 2, wherein the input location of the light source is on a side of the light guide at about a midpoint of the side.

4. The multilayer static multiview display of claim 2, wherein a grating characteristic of the diffraction grating is configured to determine the intensity and the principal angular direction, the grating characteristic being a function of both a location of the diffraction grating on a surface of the light guide and the input location of the light source on a side of the light guide.

5. The multilayer static multiview display of claim 4, wherein the grating characteristic comprises one or both of a grating pitch of the diffraction grating and a grating orientation of the diffraction grating, the grating characteristic being configured to determine the principal angular direction of the directional light beam provided by the diffraction grating.

6. The multilayer static multiview display of claim 4, wherein the grating characteristic comprises a grating depth configured to determine the intensity of the directional light beam provided by the diffraction grating.

7. The multilayer static multiview display of claim 2, wherein an emission pattern of a directional light beam of the plurality of directional light beams is wider in a direction parallel to a direction of propagation of the plurality of guided light beams than in a direction perpendicular to the direction of propagation of the plurality of guided light beams.

8. The multilayer static multiview display of claim 2, further comprising a collimator between the light source and the light guide, the collimator being configured to collimate light emitted by the light source, the plurality of guided light beams comprising collimated light beams.

9. The multilayer static multiview display of claim 1, further comprising a spacer between the first multiview display layer and the second multiview display layer, the spacer having a refractive index that is lower than a refractive index of a light guide of the each of the first and second multiview display layers.

10. The multilayer static multiview display of claim 1, wherein the first multiview display layer is configured to display the first static multiview image during a first time interval and the second multiview display layer is configured to display the second static multiview image during a second time interval.

11. The multilayer static multiview display of claim 1, wherein the first multiview display layer is configured to emit directional light beams comprising a light of a first color and the second multiview display layer is configured to emit directional light beams comprising a light of second color, the first and second colors being different from one another.

12. The multilayer static multiview display of claim 1, further comprising a third multiview display layer configured to emit directional light beams representing a third static multiview image by diffractively scattering light from a radial pattern of guided light beams within the third multiview layer, the second multiview display layer being between the third multiview display layer and the first multiview display layer, wherein the third multiview display layer is configured to be transparent to both the first static multiview image and the second static multiview image.

13. The multilayer static multiview display of claim 12, wherein the first multiview display layer is configured to emit directional light beams comprising red light, the second multiview display layer is configured to emit directional light beams comprising green light, and the third multiview display layer is configured to emit directional light beams comprising blue light, the multilayer static multiview display being configured to display a color static multiview image comprising a composite of the first static multiview image, the second static multiview image and a third static multiview image provided by the third multiview layer.

14. A static multiview display comprising:
a plurality of multiview display layers configured to provide a plurality of static multiview images, each multiview display layer comprising a light guide having an array of multiview pixels and each multiview display layer being configured to provide a different static multiview image of the plurality of static multiview images; and
a plurality of light sources, each light source of the plurality of light sources being configured to provide a radial pattern of guided light beams within the light guide of a different one of the multiview display layers,
wherein a multiview pixel of the multiview pixel array comprises a plurality of diffraction gratings configured to diffractively scatter guided light from the radial pattern of guided light beams as a plurality of directional light beams having different directions corresponding to view directions of at least three different views of a static multiview image of the plurality of static multiview images, each individual diffraction grating of the plurality of diffraction gratings being configured to diffractively scatter out a single directional light beam of the plurality of directional light beams having an intensity and a principal angular direction corresponding to an intensity and a view direction of a single view pixel of the static multiview image.

15. The static multiview display of claim 14, wherein a principal angular direction of a directional light beam provided by a diffraction grating of the plurality of diffraction gratings is determined by a grating characteristic that is a function of a relative location of the diffraction grating and the light source of the multiview display layer.

16. The static multiview display of claim 15, wherein the grating characteristic comprises one or both of a grating pitch and a grating orientation of the diffraction grating.

17. The static multiview display of claim 14, wherein the light guide of the multiview display layer is transparent in a direction orthogonal to a direction of propagation of the radial pattern of guided light beams within the light guide.

18. The static multiview display of claim 14, wherein the plurality of light sources comprises light sources of different colors, the plurality of static multiview images representing a composite color multiview image including static multiview images having the different colors.

19. A method of multilayer static multiview display operation, the method comprising:
propagating guided light within a first multiview display layer as a radial pattern of guided light beams;
diffractively scattering at least some of the guided light out of the first multiview display layer to form a plurality of directional light beams, the plurality of directional light beams having directions corresponding to different view directions of at least three different views of a first static multiview image, each directional light beam having an intensity and a principal angular direction that correspond to an intensity and a view direction of a single view pixel of the first static multiview image;
passing the plurality of directional light beams through a second multiview display layer that is adjacent to an emission surface of the first multiview display layer;
propagating second guided light within the second multiview display layer as a radial pattern of guided light beams; and
diffractively scattering at least some of the second guided light out of the second multiview display layer to form a plurality of second directional light beams, the plurality of second directional light beams having different directions corresponding to different view directions of at least three different views of a second static multiview image, each second directional light beam having an intensity and a principal angular direction that correspond to an intensity and a view direction of a single view pixel of the second static multiview image.

20. The method of multilayer static multiview display operation of claim 19, wherein propagating the guided light comprises:
guiding in a light guide a plurality of guided light beams having a common point of origin and different radial directions from one another,
wherein the intensity and principal angular direction of the directional light beam are controlled by a grating characteristic of a diffraction grating that is based on a location of the diffraction grating relative to the common origin point.

21. The method of multilayer static multiview display operation of claim 20, wherein the grating characteristic controlling the principal angular direction comprises one or both of a grating pitch and a grating orientation of the diffraction grating.

22. The method of multilayer static multiview display operation of claim 20, wherein the grating characteristic controlling the intensity comprises a grating depth of the diffraction grating.

23. The method of multilayer static multiview display operation of claim 20, further comprising providing light to be guided as the plurality of guided light beams using a light source, the light source being located at a side of the light guide, wherein the light source location is the common origin point of the plurality of guided light beams.

24. The method of multilayer static multiview display operation of claim 19, further comprising providing a composite color multiview image by emitting directional light beams of a first color representing the first static multiview image using the first multiview layer and emitting directional light beams of a second color representing the second static multiview image using the second multiview display layer, the first and second static multiview images combining to provide the composite color multiview image.

* * * * *